(12) United States Patent
Tanaka et al.

(10) Patent No.: US 9,623,365 B2
(45) Date of Patent: Apr. 18, 2017

(54) CO$_2$ RECOVERY UNIT

(71) Applicants: MITSUBISHI HEAVY INDUSTRIES, LTD., Tokyo (JP); THE KANSAI ELECTRIC POWER CO., INC., Osaka-shi, Osaka (JP)

(72) Inventors: Hiroshi Tanaka, Tokyo (JP); Takuya Hirata, Tokyo (JP); Tsuyoshi Oishi, Tokyo (JP); Takahiko Endo, Tokyo (JP); Hiroaki Ito, Tokyo (JP)

(73) Assignees: MITSUBISHI HEAVY INDUSTRIES, LTD., Tokyo (JP); THE KANSAI ELECTRIC POWER CO., INC., Osaka-shi (JP)

( * ) Notice: Subject to any disclaimer, the term of this patent is extended or adjusted under 35 U.S.C. 154(b) by 0 days.

(21) Appl. No.: 15/028,884

(22) PCT Filed: Oct. 10, 2014

(86) PCT No.: PCT/JP2014/077265
§ 371 (c)(1),
(2) Date: Apr. 12, 2016

(87) PCT Pub. No.: WO2015/056658
PCT Pub. Date: Apr. 23, 2015

(65) Prior Publication Data
US 2016/0256816 A1 Sep. 8, 2016

(30) Foreign Application Priority Data
Oct. 15, 2013 (JP) .................................. 2013-215065

(51) Int. Cl.
*B01D 53/14* (2006.01)
*B01D 53/18* (2006.01)
*B01D 19/00* (2006.01)

(52) U.S. Cl.
CPC ..... *B01D 53/1425* (2013.01); *B01D 19/0015* (2013.01); *B01D 53/1475* (2013.01);
(Continued)

(58) Field of Classification Search
CPC ............ B01D 2259/65; B01D 53/1425; B01D 53/1456; C01B 2203/0415;
(Continued)

(56) References Cited

U.S. PATENT DOCUMENTS

2007/0053817 A1 3/2007 Iijima et al.
2007/0283813 A1* 12/2007 Iijima ................ B01D 53/1406
96/235

(Continued)

FOREIGN PATENT DOCUMENTS

DE 10 2011 108 308 A1 1/2013
JP 7-51537 A 2/1995
(Continued)

OTHER PUBLICATIONS

English tranlation of Written Opinion dated Nov. 4, 2014, issued in counterpart International Patent Application No. PCT/JP2014/077265. (4 pages).
(Continued)

*Primary Examiner* — Duane Smith
*Assistant Examiner* — Cabrena Holecek
(74) *Attorney, Agent, or Firm* — Westerman, Hattori, Daniels & Adrian, LLP

(57) ABSTRACT

An absorbent regenerator includes: a rich solution supply line; a lean solution supply line; a lean-rich solution heat exchanger that is provided at an intersection of the lean solution supply line and the rich solution supply line; a branch portion that branches some of the rich solution at a downstream side of the lean-rich solution heat exchanger on the rich solution supply line; and a first mixing portion that
(Continued)

mixes the some of the rich solution branched at the branch portion with a semi-lean solution, wherein a front end of a branch line through which the some of the branched rich solution is supplied is connected to a solution storage portion of the semi-lean solution which is located at an upper stage side of the absorbent regenerator divided into parts, and the some of the branched rich solution is mixed with the semi-lean solution.

4 Claims, 8 Drawing Sheets

(52) U.S. Cl.
CPC ........ *B01D 53/18* (2013.01); *B01D 2252/204* (2013.01); *B01D 2257/504* (2013.01); *B01D 2258/0283* (2013.01); *B01D 2259/65* (2013.01); *Y02C 10/04* (2013.01); *Y02C 10/06* (2013.01)

(58) Field of Classification Search
CPC .... C01B 2203/0475; C01B 2203/0485; C01B 3/52; C10L 2290/541; C10L 3/102; Y02P 20/57
See application file for complete search history.

(56) References Cited

U.S. PATENT DOCUMENTS

| 2010/0242731 A1 | 9/2010 | Baburao et al. | |
| --- | --- | --- | --- |
| 2012/0174783 A1 | 7/2012 | Leister et al. | |
| 2013/0233015 A1* | 9/2013 | Kitamura | F23J 15/02 62/617 |
| 2015/0321137 A1* | 11/2015 | Menzel | B01D 53/1425 95/166 |

FOREIGN PATENT DOCUMENTS

| JP | 2005-254121 A | 9/2005 |
| --- | --- | --- |
| JP | 2005-254212 A | 9/2005 |
| JP | 2013-94687 A | 5/2013 |
| JP | 2013-184090 A | 9/2013 |
| WO | 2012038866 A1 | 3/2012 |

OTHER PUBLICATIONS

International Search Report and Written Opimion in Japanese dated Nov. 4, 2014, issued in counterpart International Application No. PCT/JP2014/077265 (5 pages).

Decision of a Patent Grant dated Nov. 24, 2015, issued in counterpart Japanese Patent Application No. 2013-215065, w/English translation (5 pages).

Supplementary Partial European Search Report dated Sep. 26, 2016, issued in corresponding European Patent Application No. 14853394.6, 7 pages.

Extended (supplementary) European Search Report dated Jan. 4, 2017, issued in counterpart European Application No. 14853394.6 (12 pages).

* cited by examiner

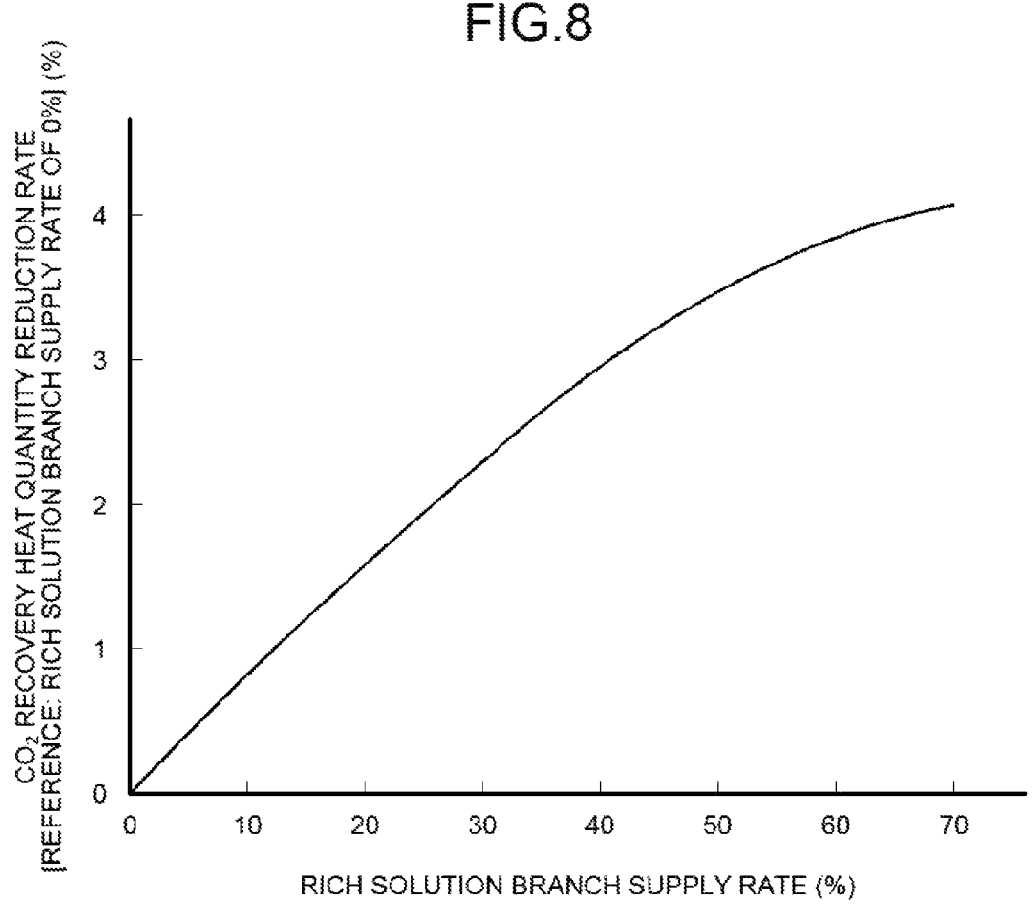

$CO_2$ RECOVERY UNIT

FIELD

The present invention relates to a $CO_2$ recovery unit capable of reducing the amount of water vapor at the time of regeneration of a $CO_2$ absorbent.

BACKGROUND

Recently, a greenhouse effect caused by $CO_2$ is noted as one reason of having global warming phenomenon. Thus, a solution for protecting earth and environment is urgently needed all over the world. As a source for generating $CO_2$, there is every human activity which is involved with combustion of fossil fuel, and thus a demand for inhibited emission tends to increase more than ever. Accordingly, for power generating facilities like thermoelectric power station which uses a large amount of fossil fuel, extensive studies are made on a method of removing and recovering $CO_2$ in flue gas by bringing flue gas from a boiler into contact with an amine-based $CO_2$ absorbent and a method of storing recovered $CO_2$ without release to air. Furthermore, as a process used for removing and recovering $CO_2$ in flue gas by using an $CO_2$ absorbent, there is a process in which flue gas is brought into contact with a $CO_2$ absorbent in an absorber, the absorbent after absorption of $CO_2$ is heated in a regenerator, and with release of $CO_2$, the absorbent is regenerated and recycled to the absorber for reuse (for example, see Patent Literature 1).

According to a method of removing and recovering $CO_2$ from $CO_2$ containing gas like flue gas by using an $CO_2$ absorbent and the process described above, the process is annexed to facilities for combustion, and thus the cost related to the operation should be reduced as much as possible. Among the above processes, the regeneration process particularly consumes a large amount of heat energy, and thus it needs to be provided as a process which can save the energy as much as possible.

Accordingly, a suggestion has been made in a related art that part of a semi-lean solution is discharged to the outside from a regenerator for heat exchange with a lean solution in a heat exchanger, subjected to heat exchange with steam condensate in a heat exchanger, and returned to a lower side than the extraction area, and by increasing the temperature of a semi lean solution fed to the bottom side of a regenerator, steam consumption amount is reduced (for example, see Patent Literature 2 (Example 8 and FIG. 17)).

CITATION LIST

Patent Literature

Patent Literature 1: Japanese Laid-open Patent Publication No. 7-51537
Patent Literature 2: Japanese Laid-open Patent Publication No. 2005-254212

SUMMARY

Technical Problem

By the way, a $CO_2$-absorbed rich solution to be introduced into an absorbent regenerator exchanges heat with a lean solution regenerated by the absorbent regenerator and is introduced into an upper part of the absorbent regenerator at a high temperature of 100° C., for example, the total amount of rich solution being introduced into the upper part of the absorbent regenerator at a time. As a result, $CO_2$ and water vapor are flushed from the rich solution introduced into the absorbent regenerator, and then the $CO_2$ gas and the water vapor are together released to the outside from the top of the regenerator. After the $CO_2$ gas and the water vapor are cooled in a condenser provided at a downstream side of the top of the regenerator, moisture is separated in a separation drum for a gas-solution separation. However, at this time, because a rich solution is introduced at a time, the flush amount and the amount of moisture to be separated increase, and the amount of water vapor to be consumed increases to that extent. As a result, there are problems that an excessive $CO_2$ dissipation load and an imbalance heat distribution occur at the top side of the regenerator and energy saving of renewable energy cannot be achieved.

Accordingly, the reduction of the amount of water vapor is further desired to reduce the consumption of heat energy in the regeneration process of the absorbent.

The present invention has been achieved to solve the above problems, and an object thereof is to provide a $CO_2$ recovery unit capable of significantly reducing the amount of water vapor and further improving energy efficiency.

Solution to Problem

The first aspect of the present invention in order to solve the above-mentioned problem is a $CO_2$ recovery unit including a $CO_2$ absorber in which a $CO_2$-containing gas comes into contact with a $CO_2$ absorbent to remove $CO_2$, and an absorbent regenerator in which a $CO_2$-absorbed rich solution is regenerated by a regenerating heater, thereby reusing a lean solution in which $CO_2$ has been removed in the absorbent regenerator, in the $CO_2$ absorber as the $CO_2$ absorbent, wherein the absorbent regenerator is divided into at least two parts and has a rich solution supply line through which the rich solution is supplied to the absorbent regenerator from the $CO_2$ absorber, a lean solution supply line through which the lean solution is supplied to the $CO_2$ absorber from the absorbent regenerator, a lean-rich solution heat exchanger that is provided at an intersection of the lean solution supply line and the rich solution supply line to exchange heat between the lean solution and the rich solution, a branch portion that branches some of the rich solution at a downstream side of the lean-rich solution heat exchanger on the rich solution supply line, and a mixing portion that mixes the some of the rich solution branched at the branch portion with a semi-lean solution in which $CO_2$ has been partially removed from the rich solution in the absorbent regenerator.

The second aspect is the $CO_2$ recovery unit according to the first aspect, wherein a front end of a branch line through which the some of the branched rich solution is supplied is connected to a solution storage portion of the semi-lean solution which is located at an upper stage side of the absorbent regenerator divided into parts to mix the some of the branched rich solution with the semi-lean solution.

The third aspect is the $CO_2$ recovery unit according to the first aspect, wherein the mixing portion is provided with a semi-lean solution extracting line through which the semi-lean solution is extracted from the solution storage portion located at the upper stage side of the absorbent regenerator divided into parts and the extracted semi-lean solution is supplied to a lower stage side of the absorbent regenerator, and the front end of the branch line through which the some of the branched rich solution is supplied is connected to the semi-lean solution extracting line to form a mixing portion in which the some of the branched rich solution is mixed with the semi-lean solution.

The fourth aspect is the $CO_2$ recovery unit according to the third aspect, wherein at an upstream side of the lean-rich solution heat exchanger interposed on the lean solution supply line, a lean and semi-lean solution heat exchanger is provided at an intersection of the lean solution supply line and the semi-lean solution extracting line, and after the some of the branched rich solution and the semi-lean solution are mixed with each other in the mixing portion, the mixed solution exchanges heat with the lean solution in the lean and semi-lean solution heat exchanger.

The fifth aspect is the $CO_2$ recovery unit according to the fourth aspect, including a steam condensate heat exchanger that is interposed at a downstream side of the mixing portion on the semi-lean solution extracting line to heat the mixed solution of the some of the branched rich solution and the semi-lean solution using residual heat of steam condensate from a regenerating heater of the absorbent regenerator.

Advantageous Effects of Invention

According to the present invention, some of a rich solution are branched before being introduced into an absorbent regenerator, and some of the branched rich solution are mixed with a semi-lean solution obtained by a removal of some of $CO_2$ from the rich solution in the absorbent regenerator, whereby an excessive dissipation load of $CO_2$ is prevented and heat distribution is improved at the top side of the regenerator, and thus energy saving can be achieved.

BRIEF DESCRIPTION OF DRAWINGS

FIG. 8 is a diagram illustrating a relation between a rich-solution branch supply rate (%) and a $CO_2$ recovery heat quantity reduction rate according to the third embodiment.

DESCRIPTION OF EMBODIMENTS

Hereinafter, preferred embodiments of the present invention will be described in detail with reference to the accompanying drawings. The present invention is not limited by these embodiments, but may be constituted in combination with each of embodiments when several embodiments are presented.

First Embodiment $CO_2$ recovery units according to embodiments of the present invention will be described with reference to FIG. 1.

Figure 1:
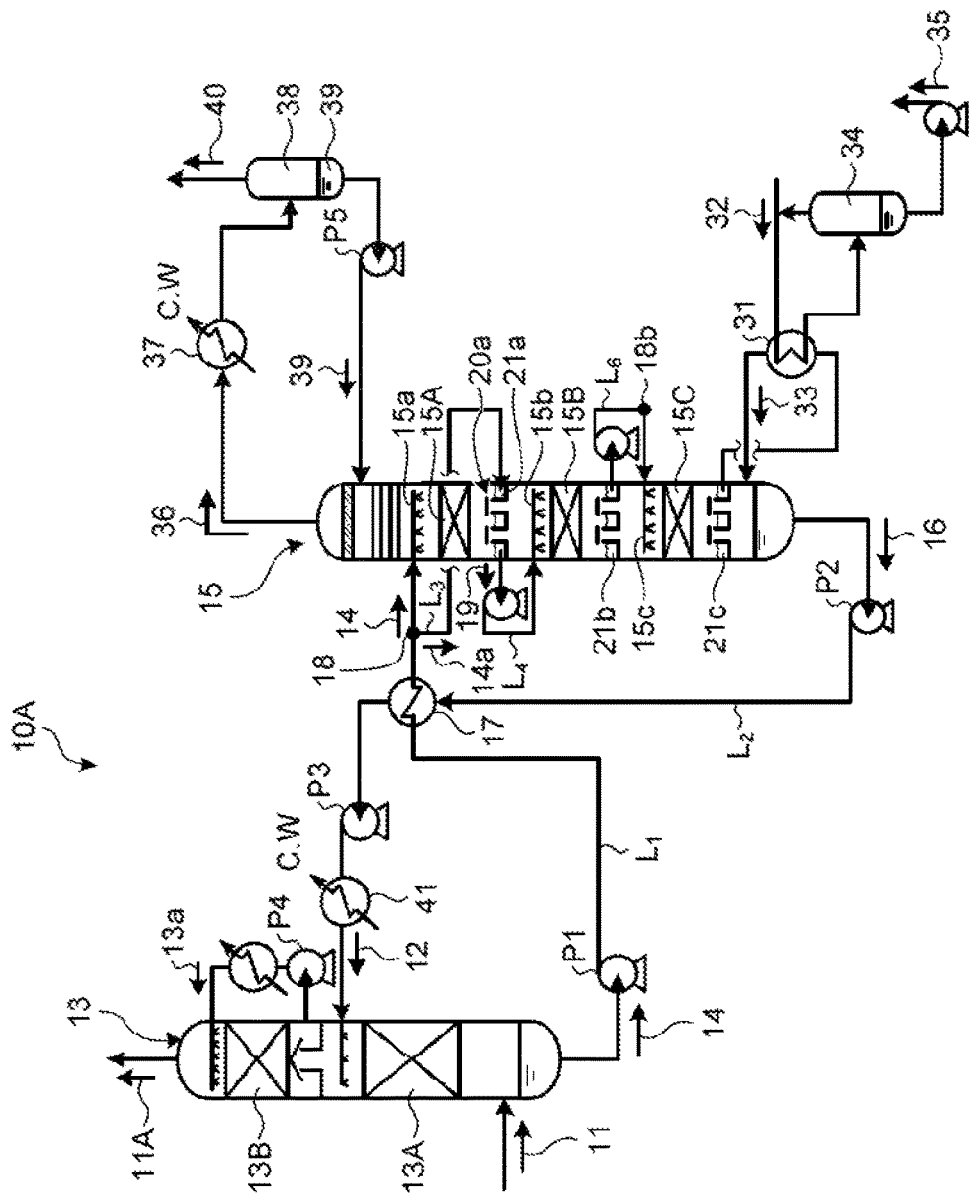
FIG. 1 is a schematic view illustrating a configuration of a $CO_2$ recovery unit according to a first embodiment.

FIG. 1 is a schematic view illustrating a configuration of a $CO_2$ recovery unit according to a first embodiment. As illustrated in FIG. 1, a $CO_2$ recovery unit 10A according to the first embodiment is a $CO_2$ recovery unit including: a $CO_2$ absorber 13 (hereinafter, also referred to as an "absorber") in which a $CO_2$-containing flue gas (hereinafter, also referred to as a "flue gas") 11 comes into contact with a $CO_2$ absorbent 12 to remove $CO_2$, and an absorbent regenerator (hereinafter, also referred to as a "regenerator") 15 in which a $CO_2$-absorbed rich solution 14 is regenerated by a regenerating heater, thereby reusing a lean solution 16, which is obtained by a partial removal of $CO_2$ in the absorbent regenerator 15, in the $CO_2$ absorber 13 as a $CO_2$ absorbent. In the $CO_2$ recovery unit, the absorbent regenerator 15 is divided into at least two parts (three parts in this embodiment), and includes: a rich solution supply line $L_1$ through which the rich solution 14 is supplied to the absorbent regenerator 15 from the $CO_2$ absorber 13; a lean solution supply line $L_2$ through which the lean solution 16 is supplied to the $CO_2$ absorber 13 from the absorbent regenerator 15; a lean-rich solution heat exchanger 17 that is provided at an intersection of the lean solution supply line $L_2$ and the rich solution supply line $L_1$ to exchanges heat between the lean solution 16 and the rich solution 14; a branch portion 18 that branches some 14a of the rich solution 14 at a downstream side of the lean-rich solution heat exchanger 17 on the rich solution supply line $L_1$; and a first mixing portion 20a that mixes some 14a of the rich solution branched at the branch portion 18 with a semi-lean solution 19 which is obtained by the partial removal of $CO_2$ from the rich solution 14 in the absorbent regenerator 15.

In the drawings, reference numeral 15A represents a first division portion of the regenerator 15, reference numeral 15B represents a second division portion, reference numeral 15C represents a third division portion, reference numeral 15a represents a first solution dispersion portion, reference numeral 15b represents a second solution dispersion portion, and reference numeral 15c represents a third solution dispersion portion.

In a $CO_2$ recovery method using the $CO_2$ recovery unit, first, a flue gas 11 containing $CO_2$ released from a boiler, a gas turbine, or the like is cooled by a gas cooling system (not illustrated) and is then sent to the $CO_2$ absorber 13.

In the $CO_2$ absorber 13, for example, the flue gas 11 comes into countercurrent contact with an amine-based $CO_2$ absorbent 12, and the $CO_2$ contained in the flue gas 11 is absorbed by the $CO_2$ absorbent 12 through a chemical reaction.

A $CO_2$-removed flue gas obtained after $CO_2$ is removed by a $CO_2$ recovery portion 13A comes into gas-solution contact with circulation washing water 13a supplied from a solution distributor in a water washing portion 13B provided in the $CO_2$ absorber 13, the $CO_2$ absorbent 12 accompanied with the $CO_2$-removed flue gas is recovered, and then a $CO_2$-removed flue gas 11A obtained by the removal of $CO_2$ is released to the outside of the unit. The circulation washing water 13a is circulated by a solution circulating pump P4.

In addition, a rich solution 14 serving as the $CO_2$ absorbent 12 which has absorbed $CO_2$ is pressurized by a rich solution pump P1, heated by a lean solution 16 serving as the $CO_2$ absorbent 12 regenerated by the regenerator 15 in the lean-rich solution heat exchanger 17, and supplied to the regenerator 15.

The rich solution 14 released to the inside from an upper part of the regenerator 15 absorbs heat by water vapor supplied from the bottom and releases most of $CO_2$. The $CO_2$ absorbent from which some or most of $CO_2$ are released in the inside of the regenerator 15 is called the "semi-lean solution 19". The semi-lean solution 19 becomes the $CO_2$ absorbent 12 from which almost all $CO_2$ are removed when reaching the bottom of the regenerator 15. Out of the lean solution 16 from which most of $CO_2$ are removed, some are heated by water vapor 32 in a regenerating heater 31, and water vapor 33 is supplied into the regenerator 15. In the drawings, reference numeral 34 represents a gas-liquid separator, and reference numeral 35 represents steam condensate.

Meanwhile, a $CO_2$ gas 36 is guided from the top of the regenerator 15, the $CO_2$ gas 36 being released from the rich solution 16 and the semi-lean solution 19 in the regenerator and accompanying with the water vapor, the water vapor is condensed by a condenser 37, and water is separated by a separation drum 38. A $CO_2$ gas 40 separated by the separation drum 38 is released to the outside of the unit, and is recovered after being compressed by a separate compressor. The recovered $CO_2$ gas 40 is pressed into an oil field using, for example, an enhanced oil recovery (EOR) or is stored in an aquifer as a measure for dealing with global warming.

Reflux water 39, which is separated and refluxed from the $CO_2$ gas 36 in the separation drum 38, is supplied to the upper part of the regenerator 15 by a reflux water circulating pump P5.

The regenerated $CO_2$ absorbent (lean solution 16) is cooled by a heat exchange with the rich solution 14 in the lean-rich solution heat exchanger 17. Subsequently, the cooled $CO_2$ absorbent, is pressurized by a lean solution pump P3, and is supplied into the $CO_2$ absorber 13 after being further cooled by a lean solution cooler 41.

In this embodiment, some of the rich solution 14 heated by the heat exchange with the lean solution 16 in the lean-rich solution heat exchanger 17 are branched at a branch portion 18, a front end of a branch line $L_3$ branched from the branch portion 18 is connected to a first solution storage portion 21a of the semi-lean solution 19, which is located at an upper stage side of the regenerator 15 divided into a plurality of stages, and thus some 14a of the branched rich solution 14 and the semi-lean solution 19 are mixed by a first mixing portion 20a.

The mixed solution is extracted from the first solution storage portion 21a, introduced into a second solution dispersion portion 15b of a second division portion 15B located at a lower stage side by a first semi-lean solution extracting line $L_4$, and comes into contact with a gas containing water vapor, whereby $CO_2$ is released. In addition, a second semi-lean solution extracted from a second solution storage portion 21b is introduced into a third solution dispersion portion 15c of a third division portion 15C located at a further lower stage side by a second semi-lean solution extracting line $L_6$, and comes into contact with a gas containing water vapor, whereby $CO_2$ is released.

As a result, since some of the rich solution 14 are branched, it is possible to prevent the increase of the flush amount of $CO_2$ and water caused by the introduction of the total amount of the rich solution 14 heated by the heat exchange in the lean-rich solution heat exchanger 17 into the upper part of the regenerator 15 as in the related art, and to achieve energy saving by the prevention of the dissipation load of the excessive $CO_2$ and the improvement of the heat distribution at the top side of the regenerator 15.

In this embodiment, the mixing portion is defined by the introduction of the front end of the line into a sidewall of the regenerator 15, but a line mixing portion may be provided to directly mix with the semi-lean solution extracting line $L_4$.

Figure 6:
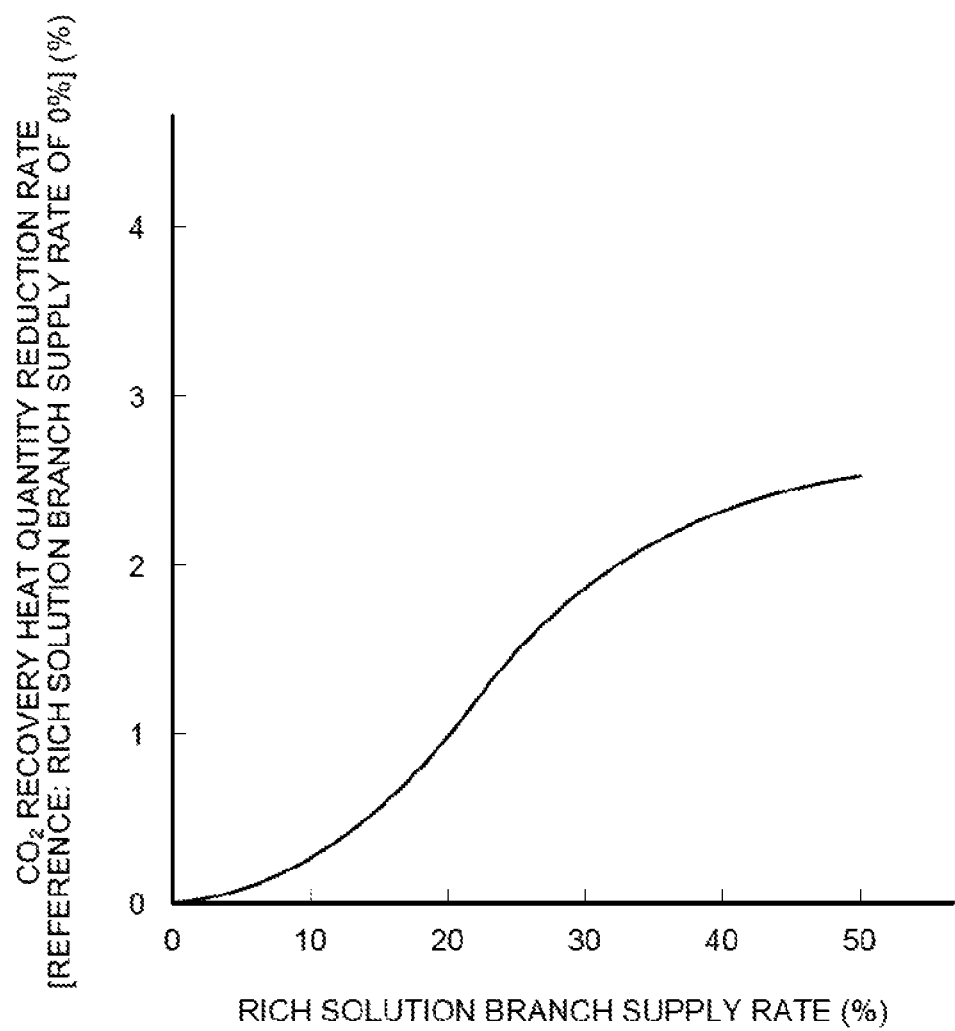
FIG. 6 is a diagram illustrating a relation between a rich-solution branch supply rate (%) and a $CO_2$ recovery heat quantity reduction rate according to the first embodiment.

FIG. 6 is a diagram illustrating a relation between a rich-solution branch supply rate (%) and a $CO_2$ recovery heat quantity reduction rate according to the first embodiment. Here, a case where the rich solution is not branched (branch supply rate is 0%) is set as a reference. As illustrated in FIG. 6, when the branch supply rate exceeds 20%, a branch effect is exhibited.

Figure 2:
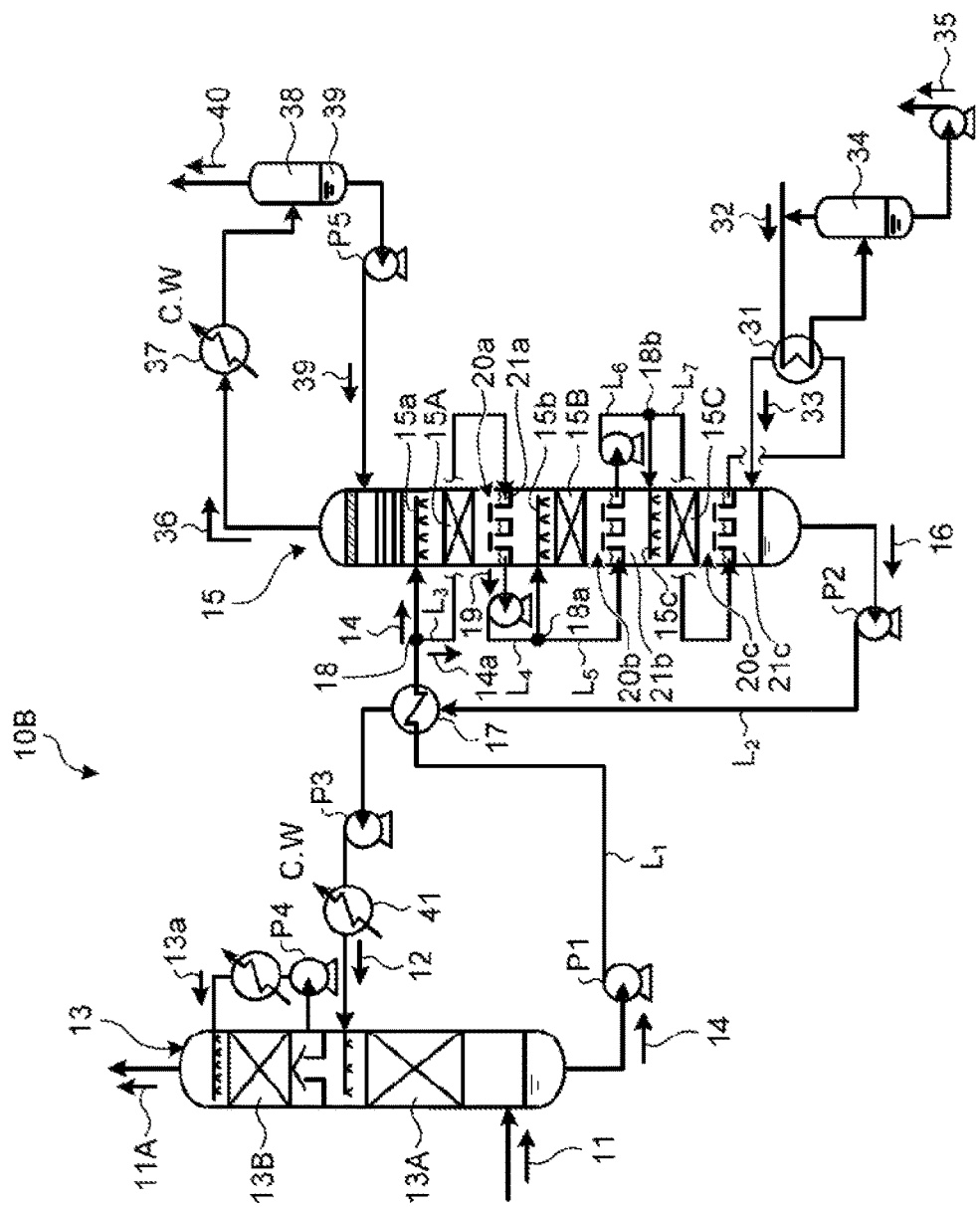
FIG. 2 is a schematic view illustrating a configuration of another $CO_2$ recovery unit according to the first embodiment.

FIG. 2 is a schematic view illustrating a configuration of another $CO_2$ recovery unit according to the first embodiment. As illustrated in FIG. 2, in a $CO_2$ recovery unit 10B according to a second embodiment, a regenerator 15 is divided into three parts, a first semi-lean solution extracting line $L_4$ is provided to extract a semi-lean solution 19 existing in a first division portion from a first solution storage portion 21a, a first branch portion 18a is provided on the first semi-lean solution extracting line $L_4$ to branch a semi-lean solution 19, some of the branched semi-lean solution 19 are introduced into a second solution storage portion 21b of a second division portion by a branch line $L_5$, and thus a second mixing portion 20b is formed.

In addition, a second semi-lean solution extracting line $L_6$ is provided to extract a semi-lean solution 19 existing in a second division portion 15B from the second solution storage portion 21b, a second branch portion 18b is provided on the second semi-lean solution extracting line $L_6$ branch the semi-lean solution 19, some of the branched semi-lean solution 19 are introduced into a third solution storage portion 21c in a third division portion 15C by a branch line $L_7$, and thus a third mixing portion 20c is formed.

In this way, after a rich solution 14 obtained by a heat exchange in a lean-rich solution heat exchanger 17 is branched by a branch portion 18, the first branch portion 18a and the second branch portion 18b are provided on the semi-lean solution extracting lines $L_4$ and $L_6$, respectively, to further extract the semi-lean solution 19, some of the semi-lean solution are introduced into the second solution storage portion 21b and the third solution storage portion 21c and mixed with each other, and thus distribution efficiency is further improved in the regenerator 15.

Second Embodiment

A $CO_2$ recovery unit according to an embodiment of the present invention will be described with reference to FIG. 3. The same members as in the configuration of the first embodiment are denoted by the same reference numerals, and the duplicated description thereof will not be presented.

Figure 3:
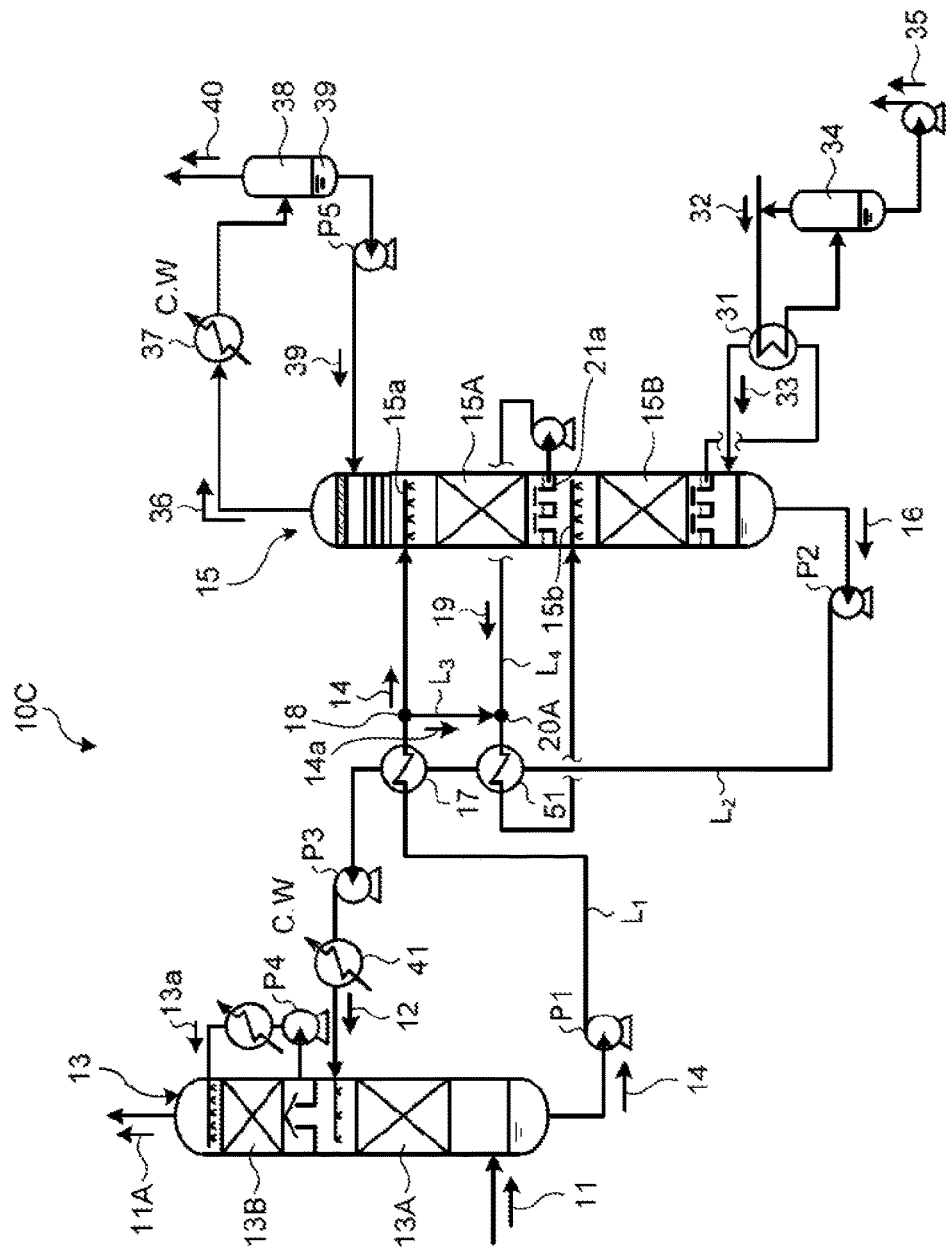
FIG. 3 is a schematic view illustrating a configuration of a $CO_2$ recovery unit according to a second embodiment.

FIG. 3 is a schematic view illustrating a configuration of a $CO_2$ recovery unit according to a second embodiment. As illustrated in FIG. 3, a $CO_2$ recovery unit IOC according to the second embodiment includes: a semi-lean solution extracting line $L_4$ through which a semi-lean solution 19 is extracted from a first solution storage portion 21a, which is located at an upper stage side of a divided absorbent regenerator 15 and stores the semi-lean solution 19, and is supplied to a lower stage side of the absorbent regenerator 15; and a line mixing portion 20A that is provided on the semi-lean solution extracting line $L_4$ and connects with a front end of a branch line $L_3$ through which some 14a of the branched rich solution 14 is supplied, thereby mixing some 14a of the branched rich solution 14 with the semi-lean solution 19.

In addition, at an upstream side of the lean-rich solution heat exchanger 17 interposed in a lean solution supply line $L_2$, a lean and semi-lean solution heat exchanger 51 is provided at an intersection of the lean solution supply line $L_2$ and the semi-lean solution extracting line $L_4$, some 14a of the branched rich solution 14 and the semi-lean solution 19 are mixed with each other in the line mixing portion 20A, and then the mixed solution exchanges heat with the lean solution 16 in the lean and semi-lean solution heat exchanger 51.

In the related art, the semi-lean solution 19 was extracted through the semi-lean solution extracting line $L_4$, and the semi-lean solution 19 was heated by exchanging heat in the lean and semi-lean solution heat exchanger 51. In this case, however, the heat of the heat exchange in the lean-rich solution heat exchanger 17 installed at the downstream side of the lean solution supply line $L_2$ was lowered, the heat held by the rich solution 14 was not sufficient to a dissipation load of $CO_2$.

In contrast, as in this embodiment, some 14a of the rich solution 14 are branched by a branch portion 18 and are mixed with the semi-lean solution 19, whereby the rich solution 14 is distributed. Thus, the dissipation load of $CO_2$ can be equalized, and energy saving of renewable energy can be achieved.

Figure 7:
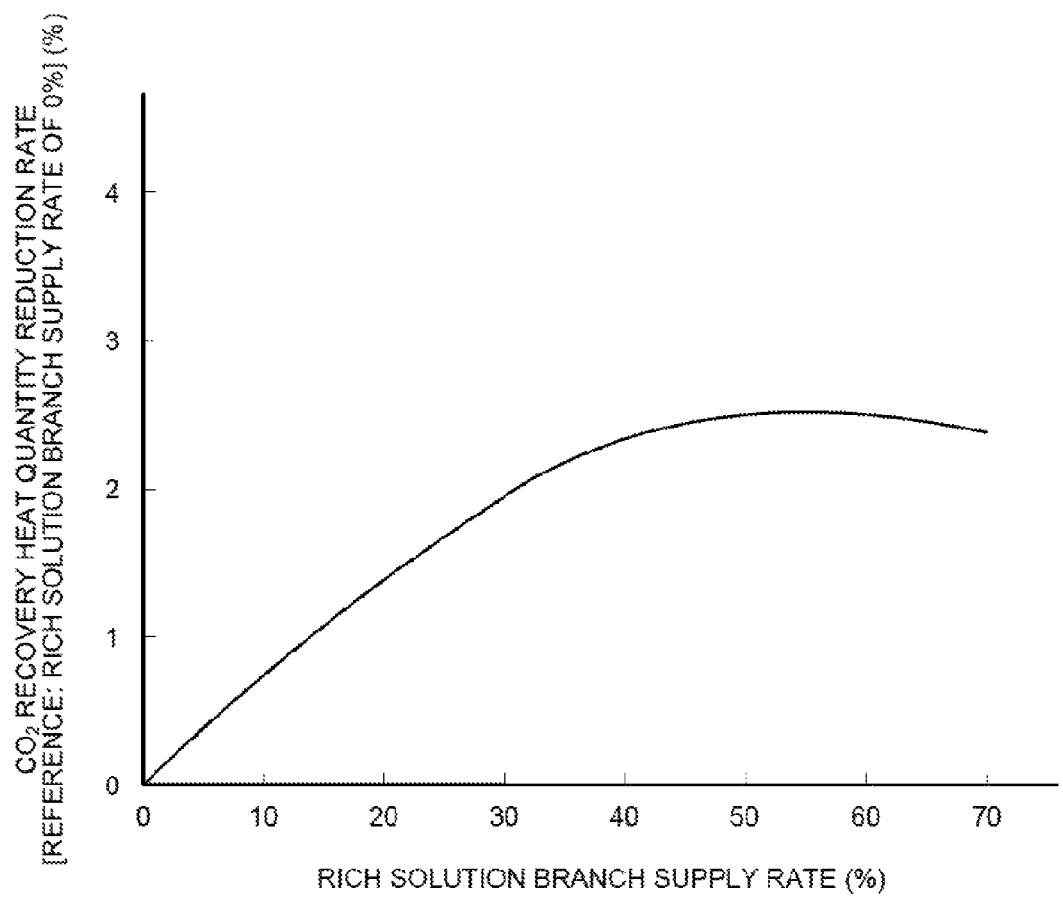
FIG. 7 is a diagram illustrating a relation between a rich-solution branch supply rate (%) and a $CO_2$ recovery heat quantity reduction rate according to the second embodiment.

FIG. 7 is a diagram illustrating a relation between a rich-solution branch supply rate (%) and a $CO_2$ recovery heat quantity reduction rate according to the second embodiment. Here, a case where the rich solution is not branched (branch supply rate is 0%) is set as a reference. As illustrated in FIG. 7, when the branch supply rate exceeds 20%, a branch effect is exhibited.

Third Embodiment

A $CO_2$ recovery unit according to an embodiment of the present invention will be described with reference to FIG. 4. The same members as in the configuration of the first embodiment are denoted by the same reference numerals, and the duplicated description thereof will not be presented.

Figure 4:
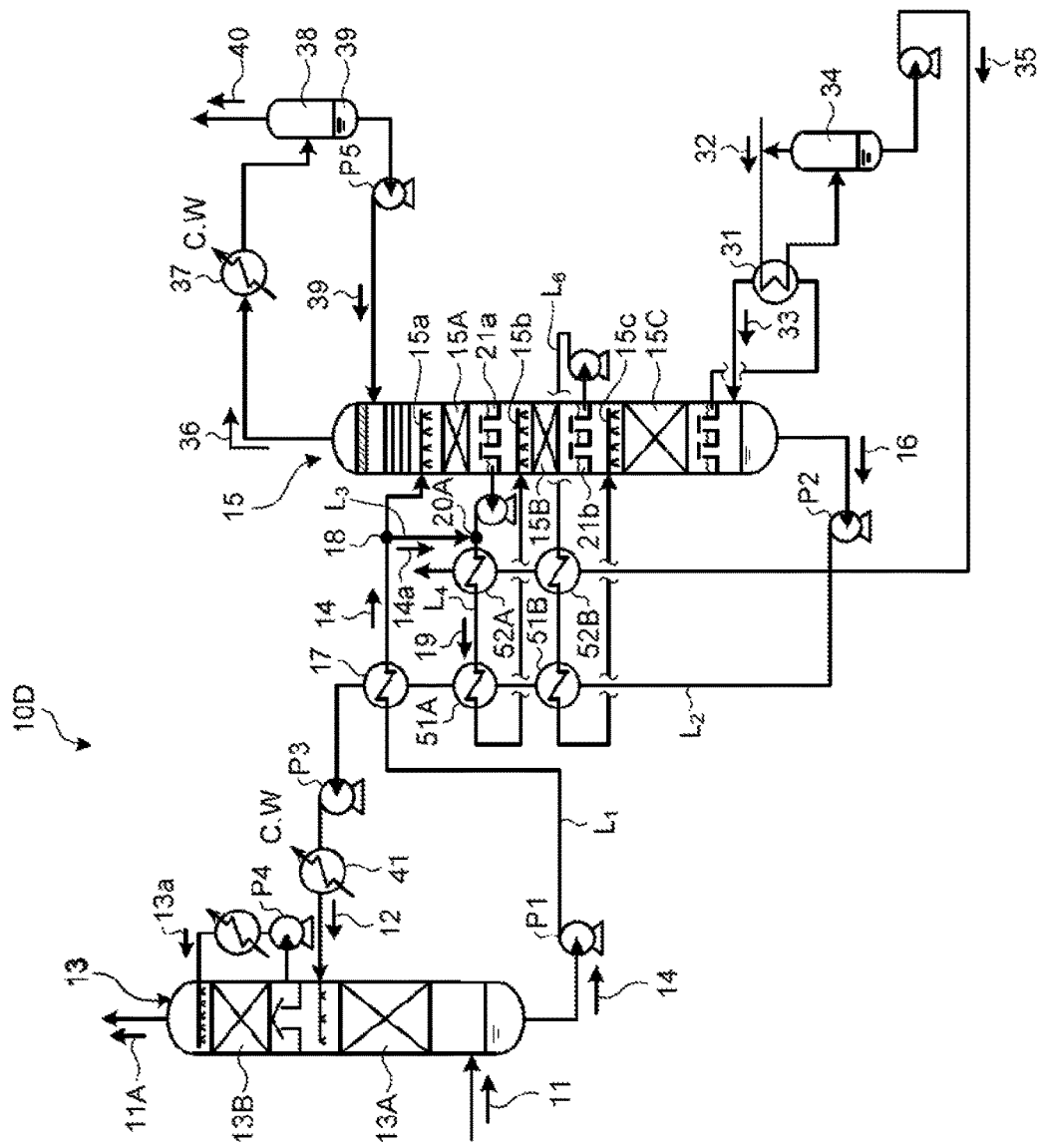
FIG. 4 is a schematic view illustrating a configuration of a $CO_2$ recovery unit according to a third embodiment.

FIG. 4 is a schematic view illustrating a configuration of a $CO_2$ recovery unit according to a third embodiment. As illustrated in FIG. 4, compared to the $CO_2$ recovery unit 10C of the second embodiment, a $CO_2$ recovery unit 10D according to the third embodiment is further configured to have a regenerator 15 divided into three parts, a first semi-lean solution extracting line $L_4$ through which a semi-lean solution 19 existing in a first division portion 15A is extracted from a first solution storage portion 21a, and a second semi-lean solution extracting line $L_6$ through which a semi-lean solution 19 existing in a second division portion 15B is extracted from a second solution storage portion 21b.

In addition, steam condensate and semi-lean solution heat exchangers 52A and 52B are provided to exchange heat of the semi-lean solution 19 extracted through the first semi-lean solution extracting line $L_4$ and heat of the semi-lean solution 19 extracted through the second semi-lean solution extracting line $L_6$ by a steam condensate 35 of a regenerating heater 31, respectively.

In this embodiment, the steam condensate and semi-lean solution heat exchangers 52A and 52B are interposed in series with lean solution and semi-lean solution heat exchangers 51A and 51B through the semi-lean solution extracting lines $L_4$ and $L_6$, respectively, such that the semi-lean solution 19 passes through each of the lean solution and semi-lean solution heat exchangers 51A and 51B after passing through each of the steam condensate and semi-lean solution heat exchangers 52A and 52B.

According to this embodiment, since the semi-lean solution 19 exchanges heat in series between the steam condensate and semi-lean solution heat exchanger 52A and the lean solution and semi-lean solution heat exchanger 51A after being joined with some 14a of a rich solution 14, an excessive dissipation load of $CO_2$ can be prevented and heat distribution can be improved at the top side of the regenerator 15, thereby achieving energy saving.

FIG. 8 is a diagram illustrating a relation between a rich-solution branch supply rate (%) and a $CO_2$ recovery heat quantity reduction rate according to the third embodiment. Here, a case where the rich solution is not branched (branch supply rate is 0%) is set as a reference. As illustrated in FIG. 8, when the branch supply rate exceeds 20%, a branch effect is exhibited.

Fourth Embodiment

A $CO_2$ recovery unit according to an embodiment of the present invention will be described with reference to FIG. 5. The same members as in the configuration of the first embodiment are denoted by the same reference numerals, and the duplicated description thereof will not be presented.

Figure 5:
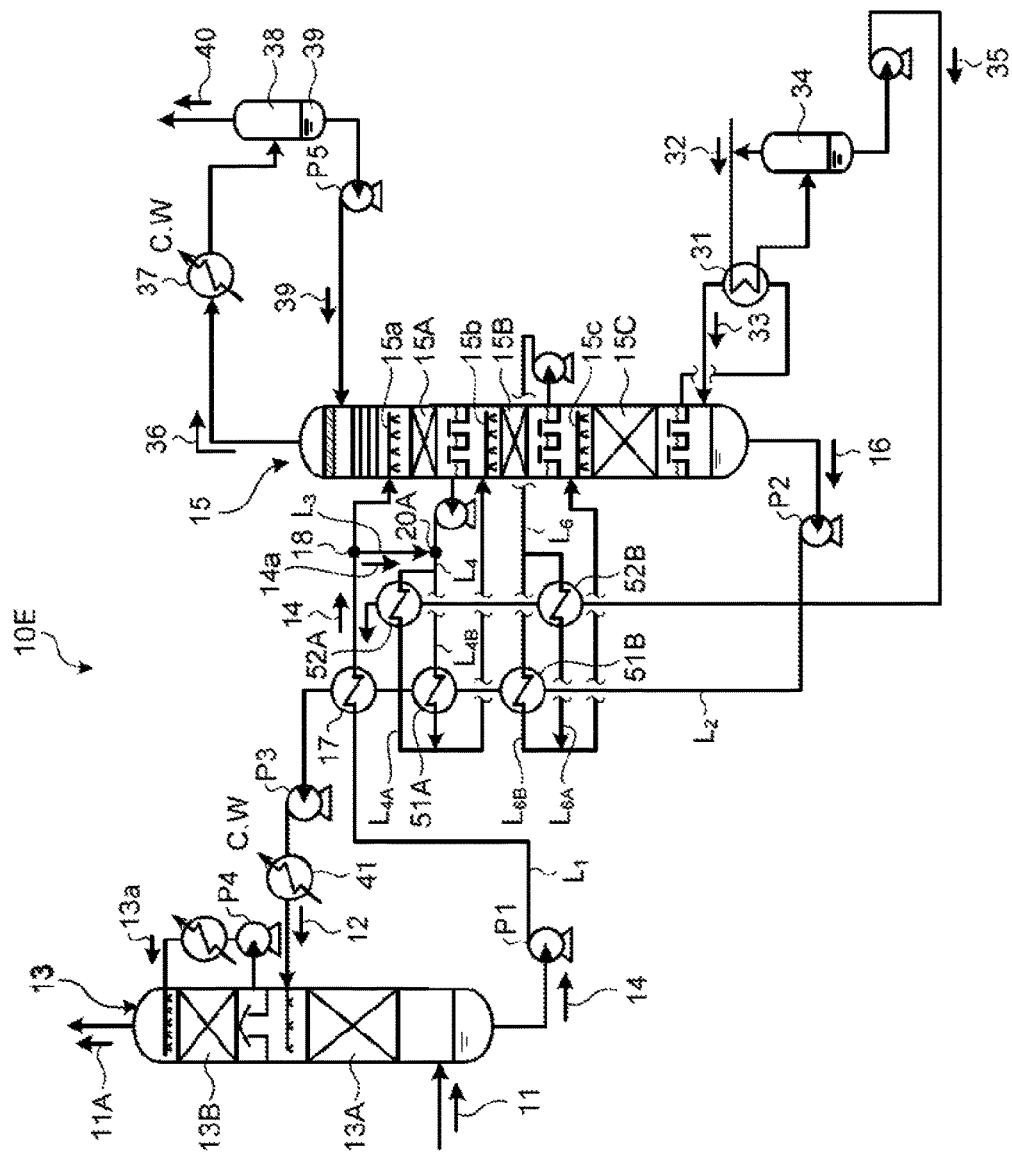
FIG. 5 is a schematic view illustrating a configuration of another $CO_2$ recovery unit according to a fourth embodiment.

As illustrated in FIG. 5, a $CO_2$ recovery unit 10E according to the fourth embodiment is further configured to include a first semi-lean solution extracting line $L_{4A}$ and a first semi-lean solution extracting line $L_{4B}$ which are branched from a first semi-lean solution extracting line $L_4$ and a second semi-lean solution extracting line $L_{6A}$ and a second semi-lean solution extracting line $L_{6B}$ which are branched from a second semi-lean solution extracting line $L_6$ in the fourth embodiment.

Then, a steam condensate and semi-lean solution heat exchanger 52A is interposed on the first semi-lean solution extracting line $L_{4A}$ to be branched at a downstream side of a mixing portion of a line mixing portion 20A on the first semi-lean solution extracting line $L_4$, and a lean solution and semi-lean solution heat exchanger 51A is interposed on the first semi-lean solution extracting line $L_{4B}$ which is branched.

A semi-lean solution 19 is joined after exchanging heat in the steam condensate and semi-lean solution heat exchanger 52A and the lean solution and semi-lean solution heat exchanger 51A, and is then supplied to a second solution dispersion portion 15b of a second division portion 15B.

Similarly, a steam condensate and semi-lean solution heat exchanger 52B is interposed on the second semi-lean solution extracting line $L_{6A}$ branched from the second semi-lean solution extracting line $L_6$, and a lean solution and semi-lean solution heat exchanger 51B is interposed on the second semi-lean solution extracting line $L_{6B}$ which is branched.

A semi-lean solution 19 is joined after exchanging heat in the steam condensate and semi-lean solution heat exchanger 52B and the lean solution and semi-lean solution heat exchanger 51B, and is then supplied to a third solution dispersion portion 15c of a third division portion 15C.

According to this embodiment, since the semi-lean solution 19 exchanges heat in parallel between the steam condensate and semi-lean solution heat exchanger 52A and the lean solution and semi-lean solution heat exchanger 51A after being joined with some 14a of a rich solution 14, an excessive dissipation load of $CO_2$ can be prevented and heat distribution can be improved at the top side of the regenerator 15, thereby achieving energy saving.

REFERENCE SIGNS LIST 10A to 10E $CO_2$ RECOVERY UNIT
11 $CO_2$-CONTAINING GAS
12 $CO_2$ ABSORBENT
13 $CO_2$ ABSORBER (ABSORBER)
14 RICH SOLUTION
15 ABSORBENT REGENERATOR (REGENERATOR)
16 LEAN SOLUTION
20A LINE MIXING PORTION
20a FIRST MIXING PORTION
20b SECOND MIXING PORTION
20c THIRD MIXING PORTION
21a FIRST SOLUTION STORAGE PORTION
21b SECOND SOLUTION STORAGE PORTION
21c THIRD SOLUTION STORAGE PORTION

The invention claimed is:

1. A $CO_2$ recovery unit comprising:
a $CO_2$ absorber in which a $CO_2$-containing gas comes into contact with a $CO_2$ absorbent to remove $CO_2$; and
an absorbent regenerator in which a $CO_2$-absorbed rich solution is regenerated by a regenerating heater, thereby reusing a lean solution in which $CO_2$ has been removed in the absorbent regenerator, in the $CO_2$ absorber as the $CO_2$ absorbent, wherein
the absorbent regenerator is divided into at least two parts and includes:
  a rich solution supply line through which the rich solution is supplied to the absorbent regenerator from the $CO_2$ absorber;
  a lean solution supply line through which the lean solution is supplied to the $CO_2$ absorber from the absorbent regenerator;
  a lean-rich solution heat exchanger that is provided at an intersection of the lean solution supply line and the rich solution supply line to exchange heat between the lean solution and the rich solution;
  a branch portion that branches some of the rich solution at a downstream side of the lean-rich solution heat exchanger on the rich solution supply line;
  a branch line that branches at the branch portion on the rich solution supply line to supply the some of the rich solution:
  a solution storage portion of the semi-lean solution which is located at a bottom of an upper stage side of the absorbent regenerator divided into parts; and
  a mixing portion that mixes the some of the rich solution with a semi-lean solution in which $CO_2$ has been partially removed from the rich solution in the absorbent regenerator,
wherein a front end of the branch line is connected to the solution storage portion of the semi-lean solution to form the mixing portion that mixes the some of the rich solution with the semi-lean solution.

2. A $CO_2$ recovery unit comprising:
a $CO_2$ absorber in which a $CO_2$-containing gas comes into contact with a $CO_2$ absorbent to remove $CO_2$; and
an absorbent regenerator in which a $CO_2$-absorbed rich solution is regenerated by a regenerating heater, thereby reusing a lean solution in which $CO_2$ has been removed in the absorbent regenerator, in the $CO_2$ absorber as the $CO_2$ absorbent, wherein
the absorbent regenerator is divided into at least two parts and includes:
  a rich solution supply line through which the rich solution is supplied to the absorbent regenerator from the $CO_2$ absorber;
  a lean solution supply line through which the lean solution is supplied to the $CO_2$ absorber from the absorbent regenerator;
  a lean-rich solution heat exchanger that is provided at an intersection of the lean solution supply line and the rich solution supply line to exchange heat between the lean solution and the rich solution;
  a branch portion that branches some of the rich solution at a downstream side of the lean-rich solution heat exchanger on the rich solution supply line;
  a branch line that branches at the branch portion on the rich solution supply line to supply the some of the rich solution;
  a solution storage portion of the semi-lean solution which is located at a bottom of an upper stage side of the absorbent regenerator divided into parts;
  a line mixing portion that mixes the some of the rich solution with a semi-lean solution in which $CO_2$ has been partially removed from the rich solution in the absorbent regenerator; and
  a semi-lean solution extracting line that extracts the semi-lean solution from the solution storage portion of the semi-lean solution and to be supplied to a lower stage side of the absorbent regenerator,
wherein a front end of the branch line is directly connected with the semi-lean solution extracting line to form the line mixing portion that mixes the some of the rich solution with the semi-lean solution.

3. The $CO_2$ recovery unit according to claim 2, wherein at an upstream side of the lean-rich solution heat exchanger interposed on the lean solution supply line, a lean and semi-lean solution heat exchanger is provided at an intersection of the lean solution supply line and the semi-lean solution extracting line, and
after the some of the branched rich solution and the semi-lean solution are mixed with each other in the mixing portion, the mixed solution exchanges heat with the lean solution in the lean and semi-lean solution heat exchanger.

4. The $CO_2$ recovery unit according to claim 3, comprising a steam condensate heat exchanger that is interposed at a downstream side of the mixing portion on the semi-lean solution extracting line to heat the mixed solution of the some of the branched rich solution and the semi-lean solution using residual heat of steam condensate from a regenerating heater of the absorbent regenerator.

* * * * *